United States Patent Office 3,172,872
Patented Mar. 9, 1965

3,172,872
DIOLEFIN RUBBERS STABILIZED WITH
MERCAPTANS AND QUINONES
Gerard Kraus and Kent W. Rollmann, Bartlesville, Okla.,
assignors to Phillips Petroleum Company, a corporation
of Delaware
No Drawing. Filed Sept. 19, 1960, Ser. No. 56,641
6 Claims. (Cl. 260—45.85)

This invention relates to the stabilization of polymeric materials. In accordance with one aspect, this invention relates to a polymer stabilized against oxidation. In accordance with another aspect, this invention relates to a method for inhibiting oxidation of polymeric materials.

Natural and synthetic rubbers, as well as polyolefins, are subject to oxidative degradation when exposed to an oxygen atmosphere, particularly elevated temperature and/or in the presence of actinic light. Such degradation results in embrittlement, loss of tensile strength and elongation, detrimental color changes, and a general deterioration in physical properties. Numerous additives have been proposed or used for inhibiting such oxidative degradation, most of which, while possibly effective in one aspect or another, have many shortcomings. The present invention relates to novel antioxidant combinations which are highly effective in stabilizing such polymers against oxidative degradation.

Accordingly, an object of this invention is to provide polymeric materials stabilized against oxidation.

Another object of this invention is to provide a method for stabilizing polymers such as natural and synthetic rubbers and polyolefins against oxidative degradation.

Still another object of this invention is to provide novel antioxidant combinations and a method for stabilizing homopolymers and copolymers of conjugated dienes against oxidative degradation.

Other objects, aspects, as well as the several advantages of the invention will become apparent to those skilled in the art upon a study of this disclosure and the appended claims.

In accordance with the present invention, it has now been found that polymers such as natural rubber and polymers of vinylidene compounds which are polymerizable to high molecular weight can be stabilized against oxidative degradation by incorporating therein a quinone compound and certain mercaptan compounds. It has been found that the addition of two materials in combination, i.e., (1) a quinone compound and (2) certain mercaptan compounds, exerts a powerful stabilizing effect against oxidative deterioration of these polymeric materials. These additives are effective even under extremely drastic conditions of oxygen exposure and temperature elevation, and are especially effective when employed in natural and synthetic rubbers.

More specifically, in accordance with the present invention it has now been found that rubbery polymers, especially homopolymers and copolymers of conjugated dienes, can be stabilized against oxidative degradation by incorporating therein (1) a quinone compound and (2) a mercaptan compound having the characteristic structural formula $R(SH)_x$ wherein R is selected from the group consisting of hydrocarbon radicals and organic radicals containing C, H, and O and $x$ is an integer from 1 to 4.

Quinone compounds that can be employed in this invention include quinone itself and substituted quinone compounds containing substituents such as alkyl, cycloalkyl, aryl, aralkyl, alkaryl, alkoxy, aryloxy, hydroxy, and the like. The quinone compounds and substituted quinone compounds employed in the invention preferably contain from 6 to 20 total carbon atoms per molecule.

Representative quinone compounds which are applicable include p-quinone, o-quinone, 2-methyl-1,4-quinone, 2,3-dimethyl-1,4-quinone, 2,5-dimethyl-1,4-quinone, 2,6-dimethyl-1,4-quinone, tetramethyl-1,4-quinone, 2-propyl-5-cyclohexyl-1,4-quinone, 2-(p-tolyl)-1,4-quinone, 6-methyl-1,2-quinone, 3,4,5-triethyl-1,2-quinone, 4,6-dihexyl-1,2-quinone, 4-phenyl-1,2-quinone, 3-benzyl-1,2-quinone, 4-decoxy-1,2-quinone, 1,4-naphthoquinone, 2-methyl-1,4-naphthoquinone, 2,6-dimethyl-1,4-naphthoquinone, 6-phenyl-1,4-naphthoquinone, 2-decyl-1,4-naphthoquinone, 1,2-naphthoquinone, 4-octyl-1,2-naphthoquinone, 4-phenyl-1,2-naphthoquinone, 3-benzyl-1,2-naphthoquinone, diphenoquinone, 2,2'-biquinone, anthraquinone, 2,5-dihydroxyquinone, 2-methoxy-1,4-naphthoquinone, 4-methoxy-1,2-naphthoquinone, 2,5-dimethoxyquinone, and the like.

Mercaptan compounds that can be employed in this invention are mercaptan compounds containing from 6 to 20 total carbon atoms per molecule and have the characteristic structural formula $R(SH)_x$ wherein R can be a hydrocarbon radical or an organic radical containing C, H, and O with the O being present in one or more ether or ester linkages, or hydroxy or carbonyl groups, and $x$ is an integer from 1 to 4. The hydrocarbon radicals can be straight or branched chain alkyl, cycloalkyl, aryl, aralkyl, alkaryl, alkylcycloalkyl, cycloalkylalkyl and combinations of these. These hydrocarbons can also be substituted by hydroxy, alkoxy, aryloxy, and the like.

Representative mercaptan compounds which are applicable include thiophenol, thio-1-naphthol, thio-2-naphthol, 4-hydroxythiophenol, 2,6-dimethylthiophenol, 4-dodecylthiophenol, 4-phenylthiophenol, 3-benzylthiophenol, 4-phenoxythiophenol, 2,4,5,7-tetramethylthio-1-naphthol, 4,5-dipentylthio-1-naphthol, 3,6-diethoxythio-1-naphthol, 4-n-propyl-5-benzylthio-1-naphthol, 8-hydroxythio-1-naphthol, 7-hydroxythio-2-naphthol, 3,4,5,6-tetraethylthio-2-naphthol, 4,8-diisopropoxythio-2-naphthol, 1,8-dimercaptonaphthalene, 1,3,6-trimercaptonaphthalene, n-hexyl mercaptan, tert-dodecyl mercaptan, n-hexadecyl mercaptan, eicosyl mercaptan, 6-phenylhexyl mercaptan, 4-(4-tolyl) butyl mercaptan, 2,6-dicyclopentylhexyl mercaptan, 1,10-dimercaptodecane, 1,4,8,12-tetramercaptododecane, 1,14-dimercapto-4,11-di-n-propyltetradecane, bis(6-mercaptohexyl)ether, ethylene glycol dimercapto acetate, ethylene glycol di(3-mercapto)butyrate, 1,10-dimercapto-5-decanone, and the like.

The stabilizers or antioxidants of the invention can be incorporated in the polymer to be stabilized in any desired amount depending upon the conditions under which the polymer is to be used. However, the total amount of stabilizer, i.e. quinone plus mercaptan, required to produce the desired stabilizing effect has been found to be relatively small and will generally range from 0.1 to 3.0 parts by weight, preferably from 0.5 to 2.0 parts by weight, per 100 parts polymer. The mole ratio of quinone compound to mercaptan compound employed will generally range from 0.5:1 to 2.0:1; however, it is ordinarily preferred to use about equimolar quantities of each of the materials.

The quinone compounds and mercaptan compounds employed as stabilizers of this invention can be prepared by any method known in the art. Also, the stabilizers can be incorporated into the polymer to be stabilized by any suitable means such as hot milling in a roll mill or hot mixing in a Banbury mixer and the like. While the present invention is not dependent upon any particular mechanism or theory it is believed that the product formed by reaction of the quinone compound with the aromatic compound at least in part is the material which functions as the antioxidant. However, as demonstrated by the specific examples, the two types of compounds can be blended and then added to the polymer, or the antioxidant compounds can be incorporated into the polymer separately. Blending of the antioxidant compounds can be effected conveniently by dissolving the materials in a common solvent. Also, as demonstrated by the specific working examples, the addition of only one of the antioxidant compounds of the invention has been found to be ineffective for inhibiting oxidative degradation.

The polymeric materials which can be stabilized according to our invention are natural rubber and polymers of vinylidene compounds which are polymerizable to high molecular weights. Included among these polymers are homopolymers of conjugated dienes having from 4 to 12 carbon atoms, preferably the conjugated dienes having 4 to 8 carbon atoms per molecule such as 1,3-butadiene, isoprene, piperylene, methylpentadiene, 2-methyl-1,3-hexadiene, phenylbutadiene, 3,4-dimethyl-1,3-hexadiene, 4,5-diethyl-1,3-octadiene, fluoroprene, chloroprene, and the like. Among these butadiene, isoprene and piperylene are preferred. In addition, suitable materials include copolymers of the above-mentioned conjugated dienes with compounds containing a vinylidene group, such as isobutylene, styrene, p-methoxystyrene, vinylnaphthalene, vinyltoluene, heterocyclic nitrogen-containing monomers such as pyridine and quinoline derivatives containing at least one vinyl or alpha-methylvinyl group, such as 2-vinylpyridine and 2-methyl-5-vinylpyridine, acrylic and alkacrylic acid esters, such as methyl acrylate, ethyl acrylate, and methyl methacrylate, methyl vinyl ether, vinyl chloride, vinylidene chloride, and the like. Polymers containing acidic groups along the polymer chain, such as polymers of acrylic acid or methacrylic acid, can also be stabilized.

Our antioxidants can also be used to treat polymers of monoolefins having 2 to 8 carbon atoms such as polyethylene, polypropylene, polybutene, copolymers of ethylene with propylene or 1-butene, and the like. These synthetic polymers of monomers containing a vinylidene group ($H_2C=C<$) can be made by a number of well known processes. Emulsion polymerization of butadiene and vinylidene-containing monomers such as styrene and the vinyl-pyridines, for example, is a well established process. Mass or solution polymerizations employing various catalyst systems are likewise known methods of preparing polymers of mono- and diolefins, for example, polyethylene, polypropylene, polybutadiene, polyisoprene, and the like.

In addition to the above materials, our antioxidants have utility in stabilizing terminally reactive polymers containing terminal hydroxy groups such as disclosed in the copending application of R. P. Zelinski, Serial No. 796,321, filed March 2, 1959.

The antioxidants or stabilizers of the invention can be employed in any of the above-described polymeric materials subject to oxidative degradation. Also, the polymer to be stabilized can contain other additives including stress cracking inhibitors, vulcanizing agents, vulcanization accelerators, other oxidation inhibitors, filler, pigments, and the like.

The following examples will illustrate the present invention in greater detail but is not to be construed as limiting the invention.

*Example I*

Butadiene was copolymerized with styrene in accordance with the following recipe:

| | Parts by weight |
|---|---|
| 1,3-butadiene | 75 |
| Styrene | 25 |
| Toluene | 1000 |
| Tetrahydrofuran | 1.0 |
| n-Butyllithium | 0.075 |
| Temperature, ° F. | 86 |
| Time, hours | 6.5 |

Butadiene was dried by liquid circulation through a series of silica gel columns. Toluene was dried by circulation through a bauxite dryer and then purged with dry nitrogen in a packed column. Styrene was vacuum distilled and then dried by purging with nitrogen. Tetrahydrofuran was flashed to remove inhibitor and stored over a sodium-lead alloy for drying. Butyllithium was obtained from a commercial source as a 2.5 molar solution in n-heptane and diluted with dry toluene to make a solution containing about 0.015 gram butyllithium per gram of solution.

Polymerization was conducted in a 20-gallon reactor. The charge order was as follows: Toluene, styrene, tetrahydrofuran, butadiene, butyllithium.

The reaction was shortstopped with water and protected with one part by weight per 100 parts rubber of tris nonylphenyl phosphite (Polygard). The polymer solution was given one dilute acid wash (0.25 part by weight per 100 parts rubber of sulfuric acid in 20 gallons water) and two cold water washes. The product was isolated by vacuum steam stripping and dried at 140° F. in a forced air dryer. It had a total styrene content of 23.7 weight percent. Properties were as follows:

| | |
|---|---|
| Inherent viscosity | 1.42 |
| Gel, percent | 0 |
| Mooney (ML-4 at 212° F.) | 56 |
| Microstructure, percent [1]: | |
| Cis | 39.1 |
| Trans | 26.8 |
| Vinyl | 34.1 |

[1] Determined by infrared analysis.

Dicumyl peroxide (0.4 part by weight per 100 parts rubber) was incorporated into the rubber which was then sheeted off the mill to a thickness of approximately 25 mils and cured 45 minutes at 307° F. Test strips ⅛ inch wide were cut from the cured sheet.

Thio-2-naphthol and 1,4-naphthoquinone were dissolved, in equimolar quantities, in benzene to make a four weight percent solution. Two weight percent solutions were also prepared of each material separately.

Samples of the cured polymer were soaked overnight at room temperature in each of the above-described solutions. They were then dried in vacuo and the dry samples aged in an oxygen atmosphere at 212° F. The sample treated with the mixture of thio-2-naphthol and 1,4-naphthoquinone was still rubbery after 96 hours aging and still had ability to swell in n-heptane, the $V_r$ value being 0.311. The corresponding value for the cured, untreated gum stock (not aged in oxygen) was 0.273. The test strips treated with thio-2-naphthol and 1,4-naphthoquinone separately showed embrittlement after aging only 24 hours and had lost their capacity to swell in n-heptane. They were hard and resinous.

These results indicate that when both the mercaptan and quinone were employed in the treating composition, the rubber was protected against extreme aging conditions whereas either ingredient alone was ineffective.

The $V_r$ determination was made by allowing samples to swell in n-heptane for six days at 86° F. (samples of approximately 1.5 grams were weighed on an analytical balance). The swollen specimens were blotted with filter paper and transferred quickly to tared weighing bottles. The volume of imbibed solvent was obtained by dividing the difference between the weight of the swollen sample and the weight of the dry, extracted sample (dried 16 hours at 158° F. in vacuo) by the density of the solvent. Next the dry samples were weighed in methanol and their volume calculated. The volume of any added ingredients was subtracted to give the volume of the polymer. The latter was used to calculate the volume fraction of polymer in the swollen stock ($V_r$). This method is described in Rubber World 135, No. 1, 67–73 (1956).

*Example II*

More of the cured but unaged test strips prepared as described in Example I and treated with each of the solutions were extended to 50 percent elongation and stress relaxation at 212° F. in oxygen was determined by the method of Tobolsky et al., J. Am. Chem. Soc. 72, 1942 (1950). Results in the following table show $f/f_0$ as a function of time where $f$ is the stress and $f_0$ is the original stress at 0 time. The extent of stress relaxation is a measure of the number of oxidative chain scissions in the vulcanized network. As the values decrease, the chain scission increases.

| Time, Hours | $f/f_0$ | | |
|---|---|---|---|
| | Thio-2-naphthol + 1,4-Naphthoquinone | Thio-2-naphthol | 1,4-Naphthoquinone |
| 0 | 1.00 | 1.00 | 1.00 |
| 0.2 | 0.99 | 0.99 | 0.97 |
| 0.4 | 0.99 | 0.95 | 0.94 |
| 0.7 | 0.99 | 0.94 | 0.90 |
| 1.0 | 0.99 | 0.90 | 0.90 |
| 1.5 | 0.99 | 0.885 | 0.88 |
| 2.0 | 0.99 | 0.85 | 0.805 |
| 2.7 | 0.98 | 0.83 | 0.78 |
| 3.7 | 1.00 | 0.805 | 0.69 |
| 4.9 | 0.89 | 0.76 | 0.63 |
| 6.5 | 0.895 | 0.64 | 0.46 |
| 8.5 | 0.89 | 0.39 | 0.34 |
| 23.8 | | 0.115 | 0.10 |
| 24.5 | | 0.03 | 0.10 |
| 32 | 0.44 | | |
| 50 | 0.34 | | |
| 96 | 0.23 | | |

These data show the contrast in effectiveness of the thio-2-naphthol-1,4-naphthoquinone composition over either ingredient used above.

*Example III*

Equal weights of thio-2-naphthol and 1,4-naphthoquinone were dissolved in toluene and refluxed two hours at 230° F. The toluene was then evaporated to give a material hereinafter designated as the crude product. During evaporation of the toluene it was noted that the product which crystallized out first was a bright blue material extremely soluble in ether. Some of the crude product was treated with ether and, upon evaporation of the ether, a material enriched in the bright blue constituent was obtained. There was no attempt at further purification. This product is hereinafter designated as the blue compound.

The crude product and blue compound, as well as several other materials, were added to antioxidant-free cis-polybutadiene using, in each case, one part by weight additive per 100 parts polymer. The samples were aged in air at 212° F. after which inherent viscosity and gel were measured as a function of time. Results are shown in the following table:

as in E and H or the reaction product can be prepared first and then incorporated into the polymer. Runs J and K show that there is no appreciable difference in antioxidant activity between the crude and blue products.

The cis-polybutadiene employed in the foregoing tests was prepared by polymerizing 1,3-butadiene in the presence of a triisobutylaluminum-titanium tetraiodide-titanium tetrachloride initiator system using toluene as the solvent. The polymer solution was washed three times with a 0.5 weight percent solution of sulfuric acid after which it was coagulated with isopropyl alcohol and dried in a vacuum oven at room temperature. The product had the following microstructure:

| | Percent |
|---|---|
| Cis | 94.3 |
| Trans | 2.6 |
| Vinyl | 3.1 |

*Example IV*

The cis-polybutadiene rubber described in Example III was compounded in accordance with the following recipe:

| | Parts by weight |
|---|---|
| Cis-polybutadiene | 100 |
| Philblack O [1] | 50 |
| Stearic acid | 2 |
| Resin 731 [2] | 3 |
| Sulfur | 1.5 |
| Santocure [3] | 1 |
| Zinc oxide | 3 |
| Antioxidant [4] | 0.1 |

[1] High abrasion furnace black.
[2] Disproportionated pale rosin stable to heat and light.
[3] N-cyclohexylbenzothiazole-2-sulfenamide.
[4] Blue compound described in Example III.

Compounded rubbery stocks were prepared with and without antioxidant, as indicated in the recipe. They were cured 45 minutes at 307° F. and then aged in air at 212° F. Results were as follows:

| | 8370-37 to 39 | |
|---|---|---|
| | Blue Compound | No Antioxidant |
| Original: | | |
| 100% Modulus, p.s.i. | 350 | 415 |
| Tensile, p.s.i. | 2,590 | 2,610 |
| Elongation, Percent | 490 | 415 |
| Aged 1 day: | | |
| 100% Modulus, p.s.i. | 540 | 570 |
| Tensile, p.s.i. | 1,825 | 1,540 |
| Elongation, Percent | 270 | 210 |
| Aged 7 days: | | |
| 100% Modulus, p.s.i. | 935 | |
| Tensile, p.s.i. | 1,635 | 1,300 |
| Elongation, Percent | 145 | 80 |

| | A | B | C | D | E | F | G | H | J | K | L |
|---|---|---|---|---|---|---|---|---|---|---|---|
| Cis-polybutadiene (A.O. Free) | 100 | 100 | 100 | 100 | 100 | 100 | 100 | 100 | 100 | 100 | 100 |
| 1,4-naphthoquinone | 1 | | | | 0.5 | | 0.5 | | | | |
| p-Quinone | | 1 | | | | 0.5 | | 0.5 | | | |
| Thio-2-naphthol | | | 1 | | 0.5 | 0.5 | | 0.5 | | | |
| Mercaptobenzothiazole | | | | 1 | | 0.5 | 0.5 | | | | |
| Crude product | | | | | | | | | 1.0 | | |
| Blue compound | | | | | | | | | | 1.0 | |
| Original: | | | | | | | | | | | |
| Inherent Viscosity | 2.46 | 2.59 | 2.52 | 2.53 | 2.49 | 2.62 | 2.57 | 2.56 | 2.55 | 2.53 | 2.47 |
| Gel, Percent | 0 | 0 | 0 | 0 | 0 | 0 | 0 | 0 | 0 | 0 | 0 |
| 24 hours at 212° F. in air: | | | | | | | | | | | |
| Inherent Viscosity | 0.96 | 1.12 | 0.95 | | 1.97 | | 1.10 | 2.04 | 2.08 | 2.02 | |
| Gel, Percent | 50 | 53 | 49 | 90 | trace | 90 | 56 | trace | 4 | 0 | 76 |
| 48 hours at 212° F. in air: | | | | | | | | | | | |
| Inherent Viscosity | | | 0.57 | | 2.14 | | | 0.74 | 1.85 | 2.02 | |
| Gel, Percent | 76 | 77 | 65 | 97 | trace | 90 | 82 | 54 | 11 | 5 | 72 |

The polymer gelled quickly upon aging in the run in which no additive was used. Mercaptobenzothiazole, used alone or in conjunction with a quinone, was ineffective. The data show that the polymer could be protected against air oxidation at elevated temperatures if the additive contained both a mercaptan and a quinone. They show further that the ingredients can be added separately These data show that there was much better retention of physical properties in the composition containing the antioxidant.

*Example V*

1,4-naphthoquinone, n-hexadecyl mercaptan, and ethylene glycol dimercapto acetate were added to antioxidant-free cis-polybutadiene in the amounts shown. The polybutadiene employed was prepared as in Example III. The samples were aged in air at 212° F. after which inherent viscosity and gel were measured as a function of time. Results are shown in the following table:

|  | A | B | C | D | E | F |
|---|---|---|---|---|---|---|
| Cis-4 (A.O. Free), parts by weight | 100 | 100 | 100 | 100 | 100 | 100 |
| 1,4-naphthoquinone, parts by weight |  | 1 |  |  | 0.5 | 0.5 |
| n-Hexadecyl mercaptan, parts by weight |  |  | 1.6 |  | 0.8 |  |
| Ethylene glycol dimercapto acetate, parts by weight |  |  |  | 1 |  | 0.5 |
| Original: |  |  |  |  |  |  |
| Inherent viscosity | 2.74 | 2.64 | 2.65 | 2.80 | 2.50 | 2.66 |
| Gel, percent | 0 | 0 | 0 | 0 | 0 | 0 |
| 24 Hours at 212° F in air: |  |  |  |  |  |  |
| Inherent viscosity |  | 2.44 |  |  | 2.02 | 2.82 |
| Gel, percent | 70 | 0 | 70 | 80 | 0 | 9 |
| 48 Hours at 212° F in air: |  |  |  |  |  |  |
| Inherent viscosity |  | 1.64 |  |  | 2.14 | 2.05 |
| Gel, percent | 63 | 55 | 84 | 88 | 18 | 37 |

These data show that the mercaptan-naphthoquinone compositions were much more effective than either material alone.

As will be evident to those skilled in the art, various modifications of this invention can be made, or followed, in the light of the foregoing disclosure and discussion, without departing from the spirit or scope thereof.

We claim:

1. As a composition of matter, a polymer of increased stability against oxidative degradation comprising a rubbery polymer of a conjugated diene having from 4 to 12 carbon atoms having incorporated therein (a) a quinone compounds selected from the group consisting of 1,4-naphthoquinone and p-quinone and (b) a mercaptan compound selected from the group consisting of thio-2-naphthol, n-hexadecyl mercaptan and ethylene glycol dimercapto acetate, the total amount of (a) and (b) ranging from 0.1 to 3.0 weight parts per one hundred (100) parts rubber and the mol ratio of (a) to (b) ranging from 0.5:1 to 2.0:1.

2. As a composition of matter, a rubbery polymer of increased stability against oxidative degradation comprising a polybutadiene rubber having incorporated therein (a) 1,4-naphthoquinone and (b) thio-2-naphthol, the total amount of (a) and (b) ranging from 0.1 to 3.0 weight parts per one hundred (100) parts rubber and the mol ratio of (a) to (b) ranging from 0.5:1 to 2.0:1.

3. As a composition of matter, a rubbery polymer of increased stability against oxidative degradation comprising a polybutadiene rubber having incorporated therein (a) p-quinone and (b) thio-2-naphthol, the total amount of (a) and (b) ranging from 0.1 to 3.0 weight parts per one hundred (100) parts rubber and the mol ratio of (a) to (b) ranging from 0.5:1 to 2.0:1.

4. As a composition of matter, a rubbery polymer of increased stability against oxidative degradation comprising a polybutadiene rubber having incorporated therein (a) 1,4-naphthoquinone and (b) n-hexadecyl mercaptan, the total amount of (a) and (b) ranging from 0.1 to 3.0 weight parts per one hundred (100) parts rubber and the mol ratio of (a) to (b) ranging from 0.5:1 to 2.0:1.

5. As a composition of matter, a rubbery polymer of increased stability against oxidative degradation comprising a polybutadiene rubber having incorporated therein (a) 1,4-naphthoquinone and (b) ethylene glycol dimercapto acetate, the total amount of (a) and (b) ranging from 0.1 to 3.0 weight parts per one hundred (100) parts rubber and the mol ratio of (a) to (b) ranging from 0.5:1 to 2.0:1.

6. As a composition of matter, a rubbery polymer of increased stability against oxidative degradation comprising a butadiene/styrene rubber copolymer having incorporated therein (a) 1,4-naphthoquinone and (b) thio-2-naphthol, the total amount of (a) and (b) ranging from 0.1 to 3.0 weight parts per one hundred (100) parts rubber and the mol ratio of (a) to (b) ranging from 0.5:1 to 2.0:1.

References Cited in the file of this patent

UNITED STATES PATENTS

| 2,686,814 | Jones | Aug. 17, 1954 |
| 2,700,029 | Cassidy | Jan. 18, 1955 |
| 2,763,883 | Wolff et al. | Sept. 25, 1956 |
| 2,784,167 | Schneider et al. | Mar. 5, 1957 |
| 2,990,420 | Gleem et al. | June 27, 1961 |